United States Patent
Karmakar et al.

(10) Patent No.: US 10,860,634 B2
(45) Date of Patent: Dec. 8, 2020

(54) ARTIFICIAL INTELLIGENCE SYSTEM AND METHOD FOR GENERATING A HIERARCHICAL DATA STRUCTURE

(71) Applicant: Walmart Apollo, LLC, Bentonville, AR (US)

(72) Inventors: Somedip Karmakar, Kolkata (IN); Sourit Manna, Kolkata (IN)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/533,081

(22) Filed: Aug. 6, 2019

(65) Prior Publication Data

US 2020/0043022 A1 Feb. 6, 2020

Related U.S. Application Data

(60) Provisional application No. 62/773,531, filed on Nov. 30, 2018.

(30) Foreign Application Priority Data

Aug. 6, 2018 (IN) .............................. 201811029546

(51) Int. Cl.
*G06F 16/35* (2019.01)
*G06F 16/31* (2019.01)
*G06Q 30/02* (2012.01)

(52) U.S. Cl.
CPC .......... *G06F 16/355* (2019.01); *G06F 16/322* (2019.01); *G06Q 30/0201* (2013.01)

(58) Field of Classification Search
CPC .. G06F 16/355; G06F 16/322; G06Q 30/0201
(Continued)

(56) References Cited

U.S. PATENT DOCUMENTS 5,794,178 A 8/1998 Caid et al.
7,111,253 B2 9/2006 Newman
(Continued)

OTHER PUBLICATIONS

Huang, Tony Cheng-Kui, "Mining the change of customer behavior in fuzzy time-interval sequential patterns", Applied Soft Computing, vol. 12, issue 3, Mar. 2012, pp. 1068-1086.*
(Continued)

*Primary Examiner* — Robert Stevens
(74) *Attorney, Agent, or Firm* — Venable LLP; Jeffri A. Kaminski

(57) ABSTRACT

Systems and methods for generating a hierarchical data structure are provided. An example method can include: acquiring sales data associated with items and item pairs in a category for a given period; filtering, based on a set of predetermined criteria, the sales data to obtain the items and the item pairs; generating document term matrices for the item pairs based on item description and item attributes; calculating attribute similarity measures and substitutability measures for the item pairs; performing, based on a set of predefined CBT generating rules, a hierarchical clustering on the document term matrices, item association, the substitutability measures and the attribute similarity measures; generating the CBT with a hierarchical grouping of the items; transforming the CBT to a dendrogram; pruning the dendrogram to generate a wireframe; regrouping the item pairs in CBT nodes with similar and substitutable attributes; and generating a user interface to visualize the CBT.

20 Claims, 14 Drawing Sheets

(58) Field of Classification Search
USPC .................................................. 707/738
See application file for complete search history.

(56) References Cited

U.S. PATENT DOCUMENTS

| | | | |
|---|---|---|---|
| 7,333,998 | B2 | 2/2008 | Heckerman et al. |
| 7,672,865 | B2* | 3/2010 | Kumar ............... G06Q 30/0605 |
| | | | 705/7.33 |
| 7,685,021 | B2* | 3/2010 | Kumar ................ G06Q 30/06 |
| | | | 705/26.2 |
| 7,801,843 | B2* | 9/2010 | Kumar ................ G06Q 30/06 |
| | | | 706/61 |
| 8,095,521 | B2 | 1/2012 | Chan et al. |
| 8,316,019 | B1 | 11/2012 | Ainslie et al. |
| 8,412,656 | B1 | 4/2013 | Baboo et al. |
| 8,805,856 | B2* | 8/2014 | Bai ..................... G06F 16/2465 |
| | | | 707/751 |
| 8,818,838 | B1* | 8/2014 | Sharma ............. G06Q 30/0202 |
| | | | 705/7.29 |
| 8,850,362 | B1 | 9/2014 | Khoshnevisan et al. |
| 9,477,732 | B2 | 10/2016 | Helfman et al. |
| 9,785,630 | B2 | 10/2017 | Willmore et al. |
| 9,785,953 | B2* | 10/2017 | Desal ................ G06Q 30/0202 |
| 9,870,629 | B2* | 1/2018 | Cardno ................ G06Q 10/10 |
| 10,210,534 | B2* | 2/2019 | Sullivan ............ G06F 16/24578 |
| 2008/0294996 | A1* | 11/2008 | Hunt ..................... G06Q 30/02 |
| | | | 715/739 |
| 2009/0018996 | A1* | 1/2009 | Hunt ................... G06F 16/2264 |
| 2012/0330779 | A1* | 12/2012 | Tuzhilin ............. G06Q 30/0269 |
| | | | 705/26.7 |
| 2013/0346352 | A1 | 12/2013 | Tiwari et al. |
| 2014/0067597 | A1* | 3/2014 | Kirkby ................... H04L 67/18 |
| | | | 705/26.7 |
| 2014/0222506 | A1* | 8/2014 | Frazer ................... G06Q 30/02 |
| | | | 705/7.29 |
| 2015/0106156 | A1 | 4/2015 | Chang et al. |
| 2015/0127419 | A1* | 5/2015 | Tiwari ............. G06F 16/24578 |
| | | | 705/7.29 |
| 2017/0200172 | A1* | 7/2017 | Wu .................... G06Q 30/0201 |
| 2017/0255536 | A1 | 9/2017 | Weissinger et al. |
| 2018/0315059 | A1* | 11/2018 | Venkatesh ........ G06Q 10/06375 |
| 2019/0311301 | A1* | 10/2019 | Pyati .................... G06F 16/901 |

OTHER PUBLICATIONS

Khade, Anindita A., "Performing Customer Behavior Analysis using Big Data Analytics", Procedia Computer Science, vol. 79, © 2016, pp. 986-992.*
Huang, Cheng-Kui, et al., "Mining the change of customer behavior in dynamic markets", Inf. Technol. Manag., vol. 16, © Springer Science+Business Media, New York, NY, 2014, pp. 117-138.*
"Dendrogram", Wikipedia, downloaded from: https://en.wikipedia.org/wiki/Dendrogram, Aug. 4, 2020, pp. 1-3.*
"Hierarchical Clustering", Wikipedia, downloaded from: https://en.wikipedia.org/wiki/Hierarchical_clustering, Aug. 4, 2020, pp. 1-8.*
"Website wireframe", Wikipedia, downloaded from: https://en.wikipedia.org/wiki/ Website_wireframe, Aug. 4, 2020, pp. 1-4.*
Fokin et al., "Constructing decision trees for user behavior prediction in the online consumer market", First Cycle, Stockholm, Sweden 2016, retrieved Nov. 12, 2019 from http://diva-portal.org/smash/get/diva2:927446/FULLTEXT01.pdf, 30 pages.
International Search Report and Written Opinion dated Oct. 21, 2019 in International Application No. PCT/US2019/045311, 8 pages.

* cited by examiner

ARTIFICIAL INTELLIGENCE SYSTEM AND METHOD FOR GENERATING A HIERARCHICAL DATA STRUCTURE

CROSS-REFERENCE TO RELATED APPLICATIONS

This patent application claims the priority to Indian Provisional Application No.: 201811029546, filed Aug. 6, 2018, and U.S. Provisional Application No.: 62/773,531, filed Nov. 30, 2018, contents of which are incorporated by reference herein.

BACKGROUND

1. Technical Field

The present disclosure relates to artificial intelligence systems and methods of generating a hierarchical data structure.

2. Introduction

A customer behavior tree (CBT) is a graphical record of a hierarchical data structure related to purchase decision made by customers when shopping for items in a category in a retail store. The attributes of the items in the category can be arranged in a tree, with the most important attribute at the root of the tree, and then the rest of the attributes arranged along the branches of the tree. The most important attribute may indicate the attribute of the item in the category that the customers most prefer when purchasing a product from the category. Moreover, the CBT analysis can reveal customer behavior patterns in a particular category for purchasing similar products. A traditional customer behavior tree is normally built only in hierarchy orders based on certain important attributes of the items sold by a retailer. The CBT can provide relative importance of each item attribute in the purchase decision process, and help retailers and manufacturers to evaluate the layout of the category. However, the traditional CBT does not show the customers' perspective about how the customers make decisions when shopping for items in the category and which items the customers may consider to be liked items or similar items to purchase.

There is a need to using a computing device to generate a customer behavior tree such that similar items in a category can be automatically identified and a visibility of the CBT data at the formed CBT nodes can be visualized in a hierarchical data structure. Therefore, items in the category may be optimally categorized to be displayed on store shelves or on a retailer's website in order to improve a cross-selling of similar items in the category.

SUMMARY

An example computer-implemented method of performing concepts disclosed herein can include: acquiring, by a processor of a computing device from a database, sales data associated with items and item pairs in a category for a given period; filtering, by the processor and based on a set of predetermined criteria and by a filter module, the sales data to obtain the items and the item pairs associated with a customer; generating, by the processor, document term matrices for the item pairs based on item description and item attributes; calculating, by the processor, attribute similarity measures and substitutability measures for the item pairs; performing, based on a set of predefined CBT generating rules, a hierarchical clustering on the document term matrices, item association, the substitutability measures and the attribute similarity measures, wherein the set of predefined CBT generating rules comprising at least one of first version CBT generating module and a step-wise CBT generating module; generating the CBT with a hierarchical grouping of the items; transforming the CBT to a dendrogram; pruning the dendrogram to generate a wireframe; regrouping, based on feedback, the item pairs in CBT nodes with similar and substitutable attributes; and generating, by the processor, a user interface to visualize the CBT.

Another computer-implemented method for generating a consumer behavior tree (CBT) visible from a customer's perspective, the method comprising: acquiring, by a processor of a computing device from a database, one year of sales data associated with all items in one or more categories; generating, by the processor, a document term matrix by assigning a vector representation to all items based on each item context of purchase; performing, by the processor based on a product vector module, a hierarchical clustering on the document term matrix using Euclidean distance and Ward linkage;

generating the CBT with a hierarchical grouping of the items; transforming the CBT to a dendrogram; pruning the dendrogram to generate a wireframe; and upon the CBT is formed, generating, by the processor, a user interface to visualize the CBT, wherein the user interface is configured to: display item details of each of CBT nodes; change names of the CBT nodes; and present item images, node demographics, word cloud and term frequency table associated with the CBT nodes.

An example system configured according to the concepts and principles disclosed herein can include: a processor; and non-transitory computer-readable storage medium having instructions stored which, when executed by the processor, cause the processor to perform operations comprising: acquiring, by a processor of a computing device from a database, sales data associated with items and item pairs in a category for a given period; filtering, by the processor and based on a set of predetermined criteria and by a filter module, the sales data to obtain the items and the item pairs associated with a customer; generating, by the processor, document term matrices for the item pairs based on item description and item attributes; calculating, by the processor, attribute similarity measures and substitutability measures for the item pairs; performing, based on a set of predefined CBT generating rules, a hierarchical clustering on the document term matrices, item association, the substitutability measures and the attribute similarity measures, wherein the set of predefined CBT generating rules comprising at least one of first version CBT generating module and a step-wise CBT generating module; generating the CBT with a hierarchical grouping of the items; transforming the CBT to a dendrogram; pruning the dendrogram to generate a wireframe; regrouping, based on feedback, the item pairs in CBT nodes with similar and substitutable attributes; and generating, by the processor, a user interface to visualize the CBT.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Example embodiments of this disclosure are illustrated by way of an example and not limited in the figures of the accompanying drawings, in which like references indicate similar elements and in which.

Figure 1A:
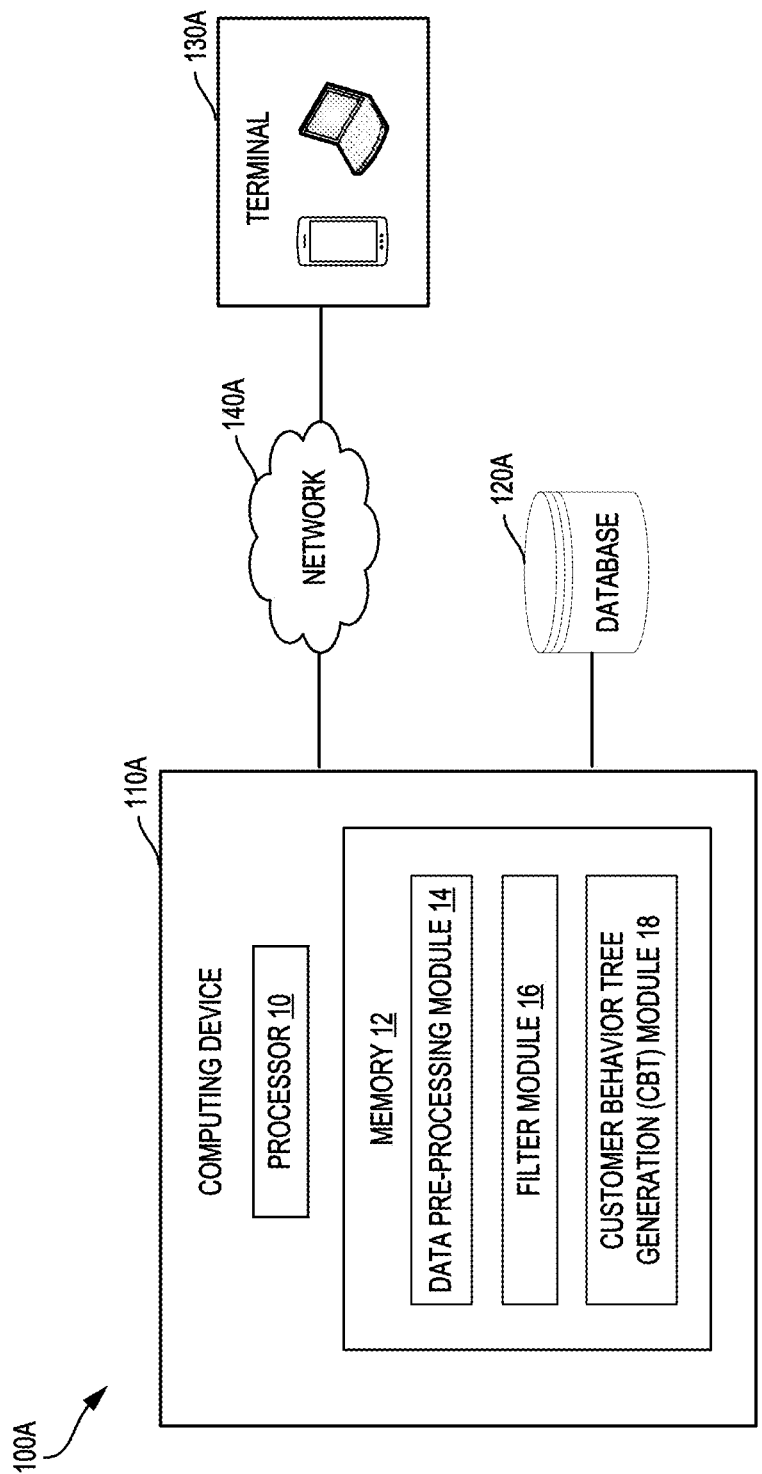
FIG. 1A is a block diagram illustrating an example computing environment in accordance with some embodiments of the present invention.

It is to be understood that both the foregoing general description and the following detailed description are example and explanatory and are intended to provide further explanations of the invention as claimed only and are, therefore, not intended to necessarily limit the scope of the disclosure.

DETAILED DESCRIPTION

Various example embodiments of the present disclosure will be described in detail below with reference to the accompanying drawings. Throughout the specification, like reference numerals denote like elements having the same or similar functions. While specific implementations and example embodiments are described, it should be understood that this is done for illustration purposes only. Other components and configurations may be used without parting from the spirit and scope of the disclosure, and can be implemented in combinations of the variations provided. These variations shall be described herein as the various embodiments are set forth.

Embodiments of the invention may provide a number of analytical methods to build different types of data relationships according to different conditions related to different data associations, such as purchase frequency, availability of attributes of items, availability of linked-transactions, transaction data quality, different transaction situations (e.g., sales market), etc. An optimal method is selected based on the availability of data to be analyzed. The selected method is then applied to the data, creating new associations among the data. These new associations are stored in a database. A graphical presentation of the associations is generated and may be displayed by a computing device. The graphical presentation may be a data structure.

The concepts disclosed herein are directed to artificial intelligence systems and methods of automatically generating a particular type of data structure, such as a customer behavior tree (CBT) by grouping a customer's purchased items in a category within similar or substitutable groups from a customer's perspective. The concepts disclosed herein can be equally applicable to other types of data structures.

In various embodiments, a hierarchical grouping of items of the CBT is generated similarly from a customer's perspective and may reflect the customer's purchase preferences and habits. A hierarchical representation of customer purchase behavior in the CBT can illustrate the way a customer makes decisions when shopping for items within the category, such as medicine, food, etc.

By measuring associated relationships between the items and the category in terms of customer behavior factors, the CBT data can assist manufacturers and retailers to understand consumers purchasing preferences and decision-making processes. Moreover, an improved customer behavior tree can be generated to identify the customer's liked items or similar items in the category in support of retailers to make customer-facing assortment decisions, such as modular planning, store localization, and item assortment decisions in the retail store.

In various embodiments, an interactive user interface may be generated to provide a visibility of the CBT data of the formed CBT. The visibility may allow variety of functionality including displaying the item details at a CBT node, changing a name of the CBT node, and displaying associated item images, node demographics, word cloud and term frequency table, etc.

FIG. 1 is a block diagram illustrating an example computing environment 100A in which some example embodiments may be implemented. The example computing environment 100A generally includes a computing device 110A, a database 120A, a terminal 130A, and network 140A.

The computing device 110A may be a local server or a computer terminal associated with a retailer. The computing device 110A may include processor 10 and memory 12. The memory 12 may store various CBT software calculation modules or executed instructions/applications to be executed by the processor 10. In some embodiments, the CBT calculation modules may include a data pre-processing module 14, a filter module 16, and one or more customer behavior tree (CBT) generation modules 18.

The computing device 110A communicates with the database 120A to execute one or more sets of processes. The database 120A may be communicatively coupled to the computing device 110A to receive instructions or data from and send data to the computing device 110A via network 140A. The customer historical sales data and product information may be stored in the database 120A. In some embodiments, the database 120A may store customer transition history during a period of time (e.g., a day/week/month/year) which includes all purchased records in retail stores.

The terminal 130A may represent at least one of a portable device, a tablet computer, a notebook computer, or a desktop computer that allows a category manager or customer to communicate with the computing device 110A to access the CBT and perform online activities via network 140A.

The network 140A may include satellite-based navigation system or a terrestrial wireless network, Wi-Fi, and other type of wired or wireless networks to facilitate communications between the various networks devices associated with the example computing environment 100A.

The one or more CBT generating modules may be selected based on the customer transaction or sales data related to repeated purchases within one particular category, especially linked-transactions data from the same customer. The transaction data may be derived for each category by using the retailer's historical transactions data associated with the category. The customer transaction data associated with the particular category may be reflected in multiple transactions during a period of time in a retail store. For example, a customer may purchase one item in a category in one day/week/month and another item in the same category another day/week/month. All purchased records may include item attributes, such as brand, fineline, price bucket, size, case packs, etc. The description of multiple items may be grouped together to form fineline description. Each category is characterized by a unique set of attributes. These attributes differ from category to category. For example, for yogurt, the attributes might be size, flavor, brand, fat percentage, and pack size. For chocolate, the attributes might be size, brand, milk/dark, nut type, and package type. Two categories can both have the same brand. The brand attribute may have different values for each of the categories.

The CBT generating modules may analyze the customer's transaction data to reflect how the customer shops in the particular category during a certain time period (e.g., a day/week/month/year) in order to identify the customer's liked items or groups of similar items to represent the customer's purchase pattern.

The data pre-processing module 14 is configured to acquire and preprocess the transaction data required by the filter module 16 for cleaning the CBT data to build a clearer CBT. The data pre-processing module 14 can obtain the retailer's transition sales data, especially customer-linked transaction data from the same customer or household.

The data pre-processing module 14 may check customer's purchase history data in a period of time (e.g., a year). The data pre-processing module 14 may find a pair of items within a category and analyze how they are similar and related to each other. For example, a customer may purchase an item A in a day or week and an item B in another day or week. A customer may purchase item A and item B together.

Figure 1B:
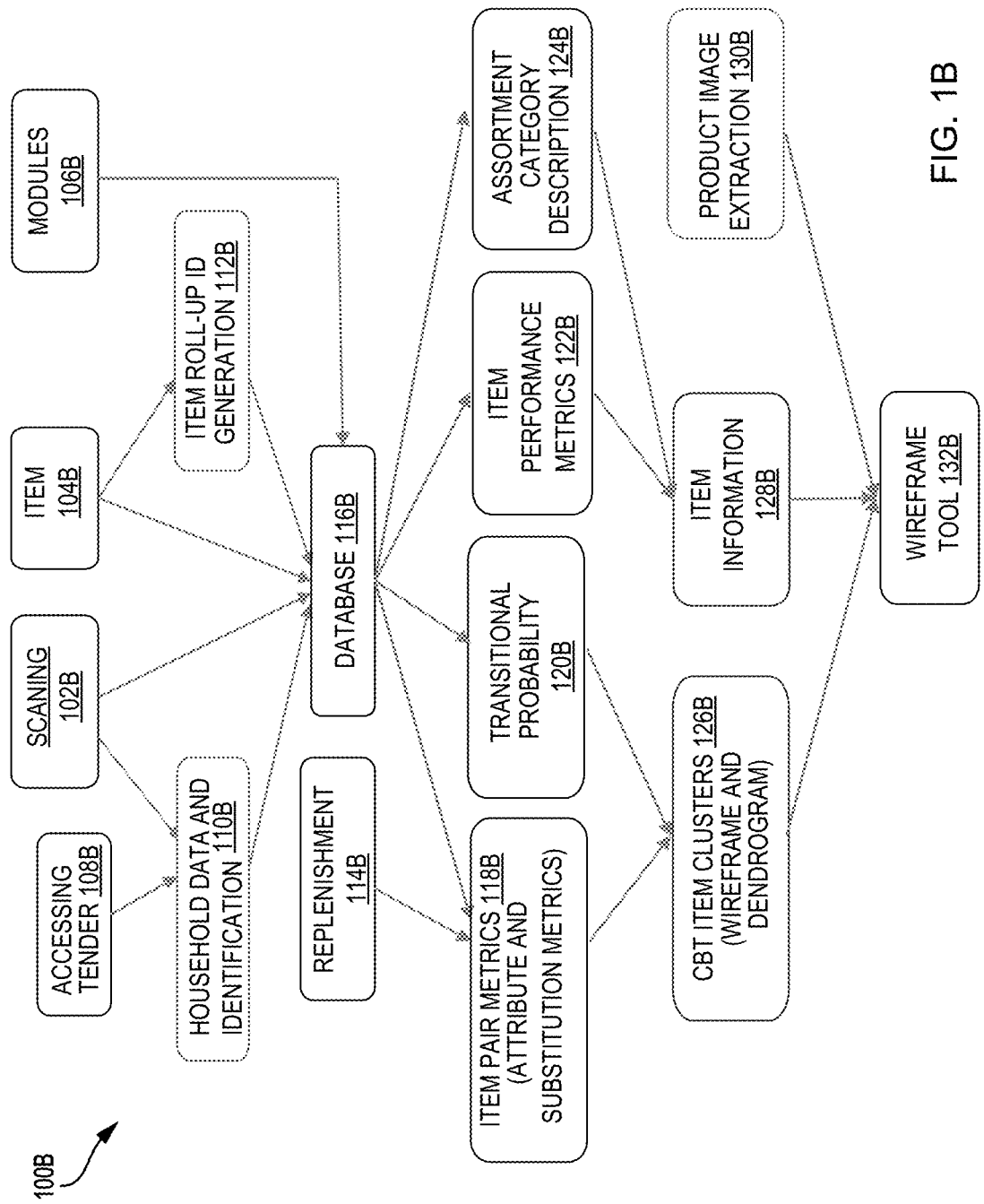
FIG. 1B is a block diagram illustrating an entire system for creating a customer behavior tree in accordance with some embodiments.

FIG. 1B is a block diagram illustrating a system 100B with an example entire workflow for creating a CBT in accordance with some embodiments.

When the customers shop in the markers, the customer purchase history may be recorded by various computing devices by scanning 102B the items 104B and reading customer credit card information. A payment tender is the method by which a payment was received. The customer may choose a payment tender when shopping in a market.

For example, the customer may make a payment using one of payment tenders, such as cash, check, credit card, debit card, etc. When the customer makes payments with credit card, the customer purchase transactions may be traceable by accessing the tender 108B and the customer household data may be traceable. When the customer shops in a category with payments by cash, the related sales data and the customer household data may not be traceable.

The system 100B may include the database 116B to store customer purchase history including sales data, sale items, and customer household data associated with the sales data. The system may include various calculation modules or executed instructions/applications to perform functions of item roll-up generation 112B and household data identification 110B.

The system 100B may use different modules 106B or algorithms to calculate and generate different types of metrics or measures associated with customers, items and item pairs, and product description, etc. For example, the system may generate item pair metrics 118B including attribute similarity and substitution metric, transitional probability 120B, item performance metrics 122B, assortment category description 124B, etc. The item pair metrics 118B and transitional probability 120B can be used to create CBT item clusters 126B. The CBT item clusters 126B can be transformed to a dendrogram for generating a wireframe.

Figure 5:
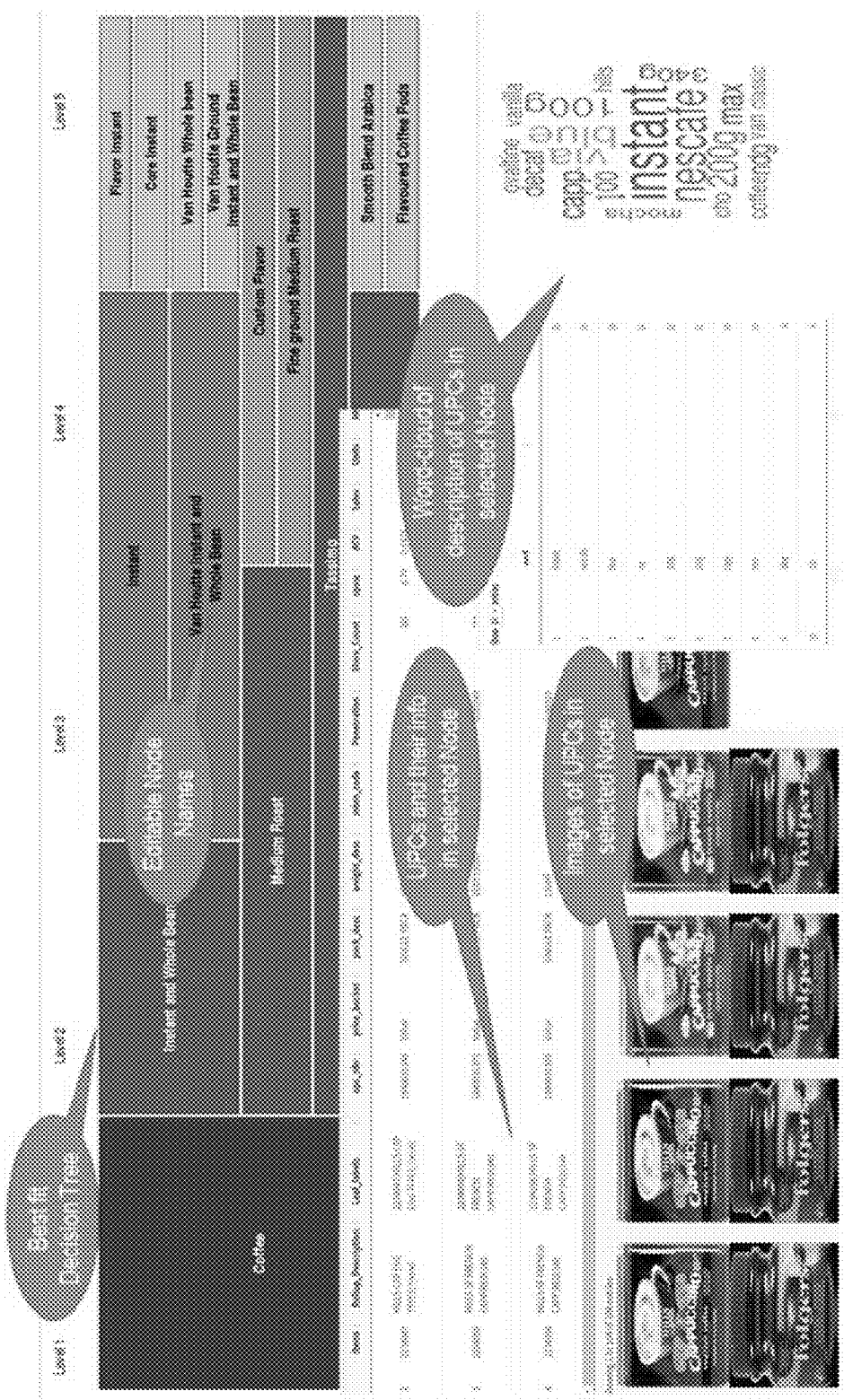
FIG. 5 is a diagram illustrating an example wireframe tool in accordance with some embodiments.

Referring to FIG. 5 described below, the system may conduct product image extraction 130B to acquire product images and obtain related item information 128B including item performance metrics 122B and item assortment category description 124B.

In some embodiments, the system may provide an interactive user interface to allow the generated CBT visible to the customer via a wireframe tool 132B by combining related item information 128B and product images from product image extraction 130B.

Figure 2:
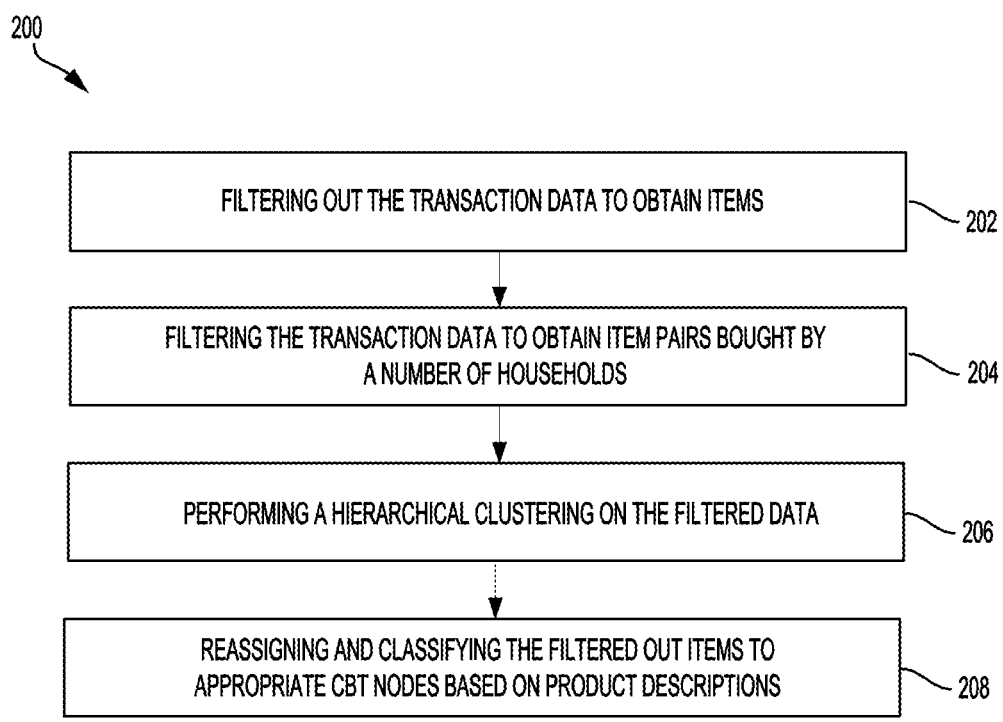
FIG. 2 is a flowchart diagram illustrating an example customer behavior tree (CBT) generating process using a filter module in accordance with some embodiments.

FIG. 2 is a flowchart diagram illustrating an example CBT generating process 200 using a filter module in accordance with some embodiments.

The process 200 may be implemented in the above described systems and may include the following steps. Steps may be omitted or combined depending on the operations being performed. The filter module 16 may include two functional filters which are an item filter and a household filter.

In step 202, the filter module 16 is configured to filter the transaction data to obtain items which are sold in a certain number of stores and contribute to a certain amount of sales. In one embodiment, the filter module may filter the transaction data to obtain items which are sold in at least 10% stores and contribute to 95% of cumulative sales.

Transactions data requirements may be adjustable in order to control the extent of the filtering. In some embodiments, the percentages of a number of stores or the cumulative sales can be adjusted in generating a CBT for a particular category. The filter module is used to obtain data important to the sales market by filtering out customers who have short transaction histories and items which are rarely purchased by different households or customers.

Some of the item transactions may not reflect the customer purchase patterns within the category and may be treated as a random noise. For example, one customer may purchase two random items together in one day within a year. There are no switching behavior related to them. The two items are not really related to each other and are also not categorized together. Such transaction data is considered as a random noise or low confidence data that needs to be removed by the filter module 16. There may be many similar cases in the customer's transaction data. Some items may also be filtered out if they do not contribute too much to the sales or they are not purchased together by many households. Since those sales data does not contribute too much to the CBT, filtering out those items may not reflect the overall customer's factors. Further, the smaller amount of some sales items may lead to a very different CBT which may not be very useful to increase the retail sales.

In step 204, the household filter may be configured to filter the transaction data and obtain items in which item pairs are bought by a number of households, for example, at least 1000 households. The household filter may be further configured to obtain item pairs bought together by at least 100 households. Filtering out those low confidence data can reduce the entire category volume items to be analyzed. In some embodiments, the system can modify the filter module 16 based on the customer's purchase frequency of the items in the category.

In step 206, the system may perform a hierarchical clustering on the filtered data based on either first version module or alternative methodologies or modules which will be described below.

In step 208, the filtered out items may be reassigned and classified into appropriate CBT nodes based on product descriptions using nearest neighbourhood and text analytics.

Term description and attributes of the filtered items may be used to make a corpus for creating a document term matrix. The document term matrix may be used to classify the filtered items into appropriate CBT nodes using predictive K nearest neighbor (KNN) query and text analysis. The document term matrix may include various attributes or description associated with the items.

Appropriate filters and classification can be used and result in clean and interpretable CBTs, for high frequency categories, such as food to go and red meat.

Figure 3:
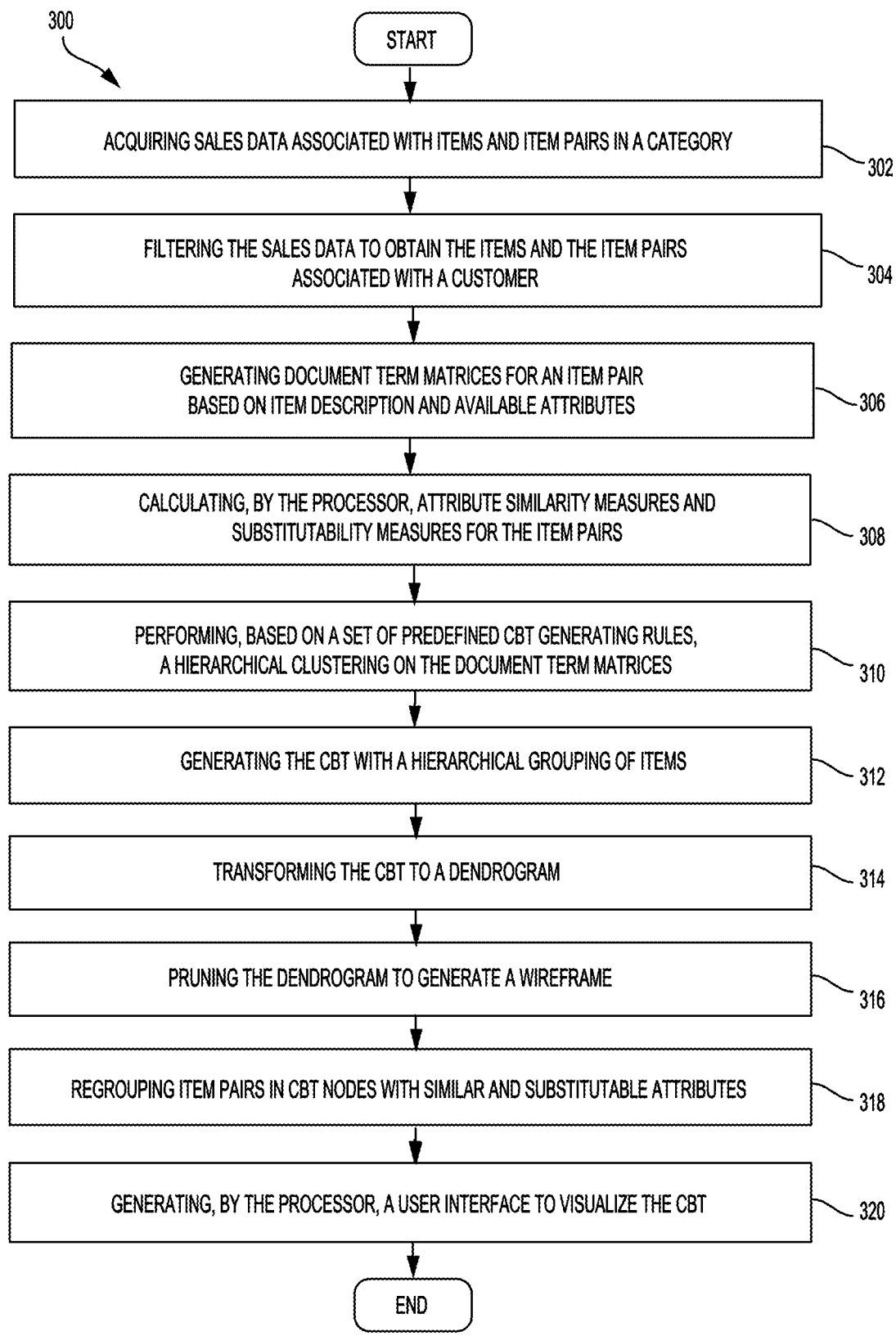
FIG. 3 is a flowchart diagram illustrating an example process for generating a CBT in accordance with some embodiments.

FIG. 3 is a flowchart diagram illustrating an example process 300 for generating a CBT which is similar from a customer's perspective in accordance with some embodiments.

In step 302, a data pre-processing module is configured to acquire sales data related to items in a category for a given period. In some embodiments, a year of customer-linked sales data may be used for analysis to generate a CBT.

In step 304, a filter module may be configured to obtain items and item pairs associated with households and stores. For example, the items and item pairs may be sold in at least 10% retail stores and contribute to 95% of cumulative sales of the retail stores. The filter module may obtain item pairs bought by at least 1000 households and bought together by at least 100 households. The numbers of items and item pairs required to generate a CBT may be dynamically adjusted based on different situations with regard to items and item pairs, retail stores, sales market, etc. The filtered items may be reclassified based on document term matrices.

In step 306, document term matrices may be generated for item pairs based on item description and available attributes.

In step 308, calculating, by the processor, attribute similarity measures and substitutability measures for the item pairs.

In step 310, a step-wise hierarchical clustering is performed on the document term matrices, item association, substitutability measures and attribute similarity, based on a set of predefined rules. The set of the predefined rules are associated with various CBT generating modules or alternative methodologies which are selected under different situations. The substitutability measures is associated with substitutability similarity measures.

In step 312, the CBT is generated with a hierarchical grouping of items. The hierarchical grouping of items may be classified into appropriate CBT nodes based on item description and attributes.

Figure 4:
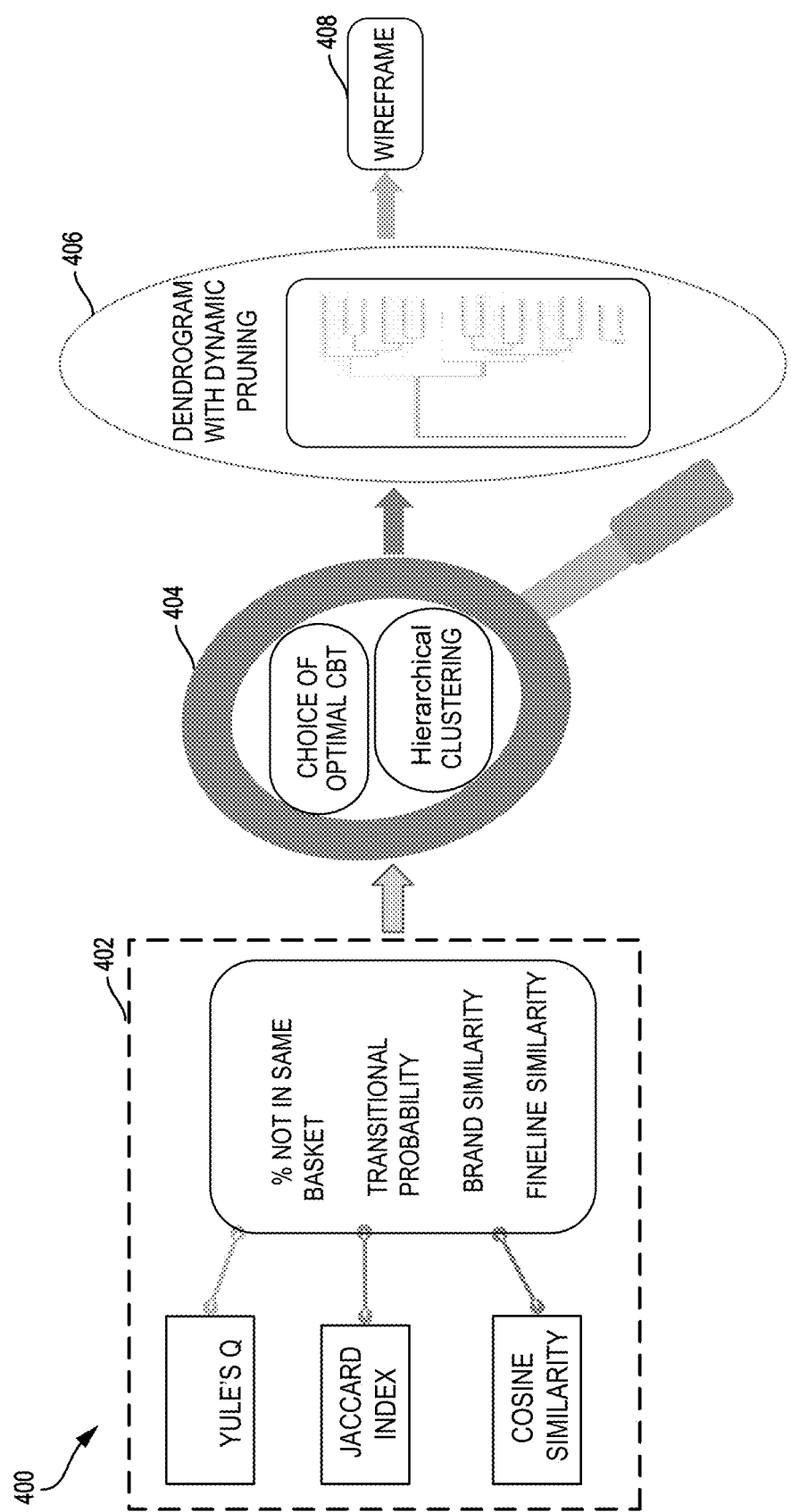
FIG. 4 is a diagram illustrating an example first version of a CBT generating process 400 in accordance with some embodiments.

In step 314, the CBT is transformed to a dendrogram. Referring to FIG. 4 described below, the corresponding dendrogram is generated to visualize the CBT clusters produced by the hierarchical clustering of the items. The horizontal axis of the dendrogram represents the distance or dissimilarity between the clusters. The vertical axis represents the items and clusters. Each joining of two clusters is represented on the graph by the splitting of a horizontal line into two horizontal lines. The horizontal position of the split, shown by the short vertical bar, gives the distance (dissimilarity) between the two clusters.

In step 316, the dendrogram may be pruned to generate a wireframe with a wireframe tool. In some embodiments, the CBT may be pruned at different node levels in order to optimize the tree size based on a measure of the CBT height or until a given number of CBT clustering groups remain. In one embodiment, the first version module may dynamically prune the CBT at different node levels to optimize the tree size based on a measure of the CBT height or until a given number of CBT clustering groups remain.

In step 318, based on feedback, item pairs in CBT nodes may be regrouped with similar and substitutable attributes.

In step 320, upon the CBT is formed, an interactive user interface may be generated by the processor to visualize the CBT for displaying item details of each of CBT nodes, changing names of the CBT nodes and presenting item images, node demographics, word cloud and term frequency table associated with the CBT nodes.

Referring to FIG. 5, the visibility may allow the user via the user interface to view the product details at a particular CBT node, change a name of the CBT node, and view product images, node demographics, word cloud and term frequency table.

FIG. 4 is a diagram illustrating an example CBT generating process 400 using a first version module in accordance with some embodiments. The CBT generation module 18 may perform hierarchical clustering on the filtered data processed by the filter module 16 based on either a first version module or alternative methodologies described below.

The CBT calculation applies the similarity calculation to attribute values as well as purchase patterns associated with item pairs in order to find the similarities to show how the customer makes decisions between similar items.

In some embodiments, the CBT calculation uses one household's customer-linked transaction history data for a given period (e.g., within one year duration) to find the customer behaviors of purchasing item 1 and item 2 within a category. For example, a customer may purchase item 1 and item 2 in different days or the customer may purchase both items together at the same day. The sales data of purchasing item 1 and item 2 for one household are represented as different matrices including different attributes. Based on customer's one year transaction data, different types of matrices may be generated by the data pre-processing module 14 to include data of the item pairs, such as purchasing date, item name, and various attributes which may include size, brand, fineline, pack size, price, description, price, etc. The item attributes may differ from category to category. Different algorithms may be used to calculate related matrices to analysis how those two items are associated with each other. The switching behavior of the customer among the item pairs in the category at the store may be analyzed to see whether two items are substitutable.

In step 402, the first version module may utilize different algorithms and conduct different calculation or distance measures of the related matrices of the pair of items, such as percentage (%) of not being in same basket, subsequent transitional probability, brand similarity, and fineline similarity. These measures may show how the pair of items in the category are associated with and similar to each other.

Yule's Q algorithm is a measure of association used to indicate the strength of relationship between two items at nominal or higher level. In some embodiments, Yule's Q algorithm is used to calculate a percentage (%) that a pair of purchased items in one category are not purchased in the same basket or in one visit (e.g., percentage of not being in same basket). If the percentage of not being in same basket of the two items is high, the item pair may be similar to or substitutable for each other.

Jaccard index is a statistic used for comparing the similarity and diversity of sample sets. In some embodiments, Jaccard index is used to calculate subsequent transitional probability of the pair of purchased items or switching proportion between the two items in the category to show the customer switching behavior. The high subsequent transitional probability or switching proportion of the pair of items may indicate the two items may be similar times or substitutable items for each other.

Cosine similarity is a measure of attribute similarity between two items in a category and measures a cosine of the angle between them. A number between 0 and 1 of Cosine similarity indicates how substitutable those two items are. Cosine similarity can be used to calculate brand similarity, fineline similarity or other types of attribute similarity of a pair of purchased items in the category, such as two types of juice. The calculation results may show the similarity for the two items with regard to different attributes and represent how they are associated with each other.

The first version module is selected to generate the CBT based on a high correlation between attribute similarities and substitutable similarity. The high correlation can show how the attributes are associated with the substitutable features of the item pair. If the correlation between attribute similarities and substitutable similarity is low, the system may choose a different module, such as step-wise module for generating the CBT.

In step 404, a hierarchical clustering is applied to the generated similarities such that the substitutable similarity measures and the attribute similarity measures are combined to choose an optimal CBT and to further create hierarchical clustering of the items with association metrics at an item group level.

In step 406, a corresponding dendrogram is generated to visualize the clusters produced by the hierarchical clustering of the items. The first version of CBT generating process can be applied to categories, such as food to go, medicines, etc.

In step 408, based on the generated CBT data, a wireframe tool is used to transform and display the generated CBT data on an interactive user interface to provide a category manager with a visibility of the CBT data.

Referring to FIG. 5, an example wireframe tool is illustrated in accordance with some embodiments. The example wireframe tool may be used to visualize all types of CBT generated by different modules or alternative methodologies. The components of a wireframe tool may allow the customer to: select a node and view the product details; change the default node names; view product images; view node demographics; and view word cloud and term frequency table.

The category manager may check each node at different hierarchical levels to review the item details belonging to the node and understand how the items are associated with each other. The category manager may further decide where the items need to be assorted or be displayed on shelves for increasing customer satisfaction and improving a cross-selling of similar items in the category.

Figure 6A:
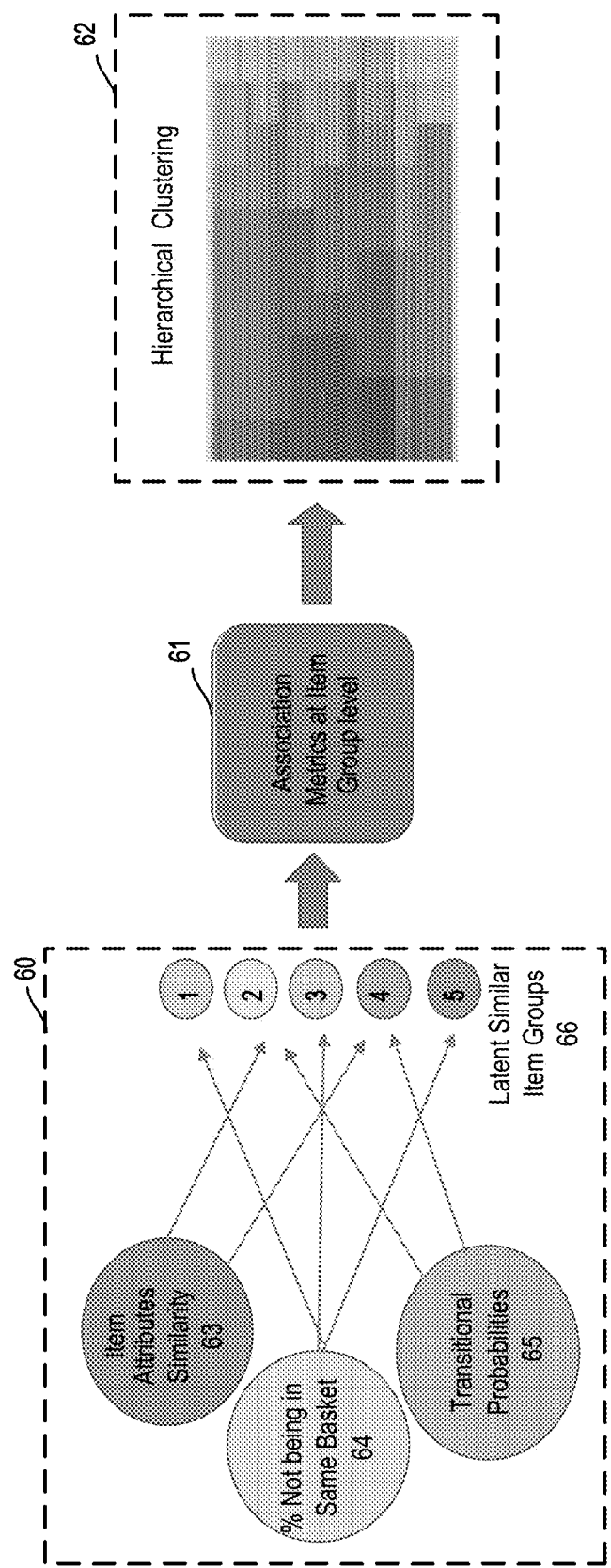
FIG. 6A is a diagram illustrating an example step-wise module of a CBT generating process in accordance with some embodiments.

FIG. 6A is a diagram illustrating an example CBT generating process using a step-wise module in accordance with some embodiments.

The purpose of CBT is to get a hierarchical structure of item groups which reflects the customer purchase pattern. The leaf nodes of the CBT constitute items which are very similar and substitutable for the customer to choose.

A step-wise module is used to group items through two different dimensions: 1) how the customer purchases similar items within a category; 2) similar items in terms of usage can be easily substituted with each other. The system may choose a step-wise module for generating the CBT based on a low correlation between attribute similarities and substitutable similarities.

In some embodiments, the term description and all available attributes of the items in a category may be used to make a corpus for generating a document term matrix. The CBT calculation 60 may apply a step-wise module by using a plurality of attribute similarities 63 as well as substitutable similarity including percentage (%) of not being in same basket 64 and subsequent transitional probability 65. Based on the generated document term matrix, the plurality of attribute similarities may be calculated with regard to all types of attributes, such as brand, fineline, size, pack size, price, description, etc. A substitutable similarity measure may also be calculated.

Figure 6B:
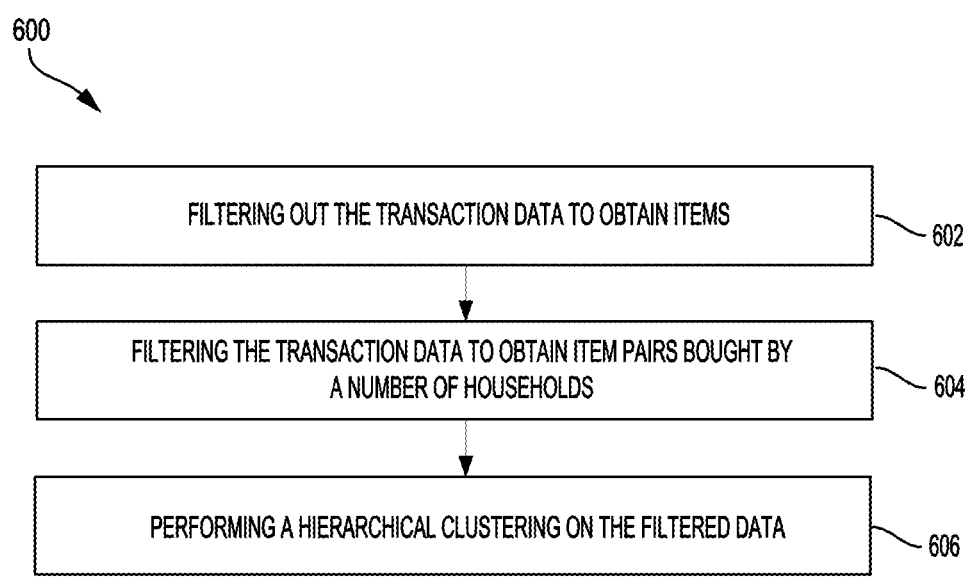
FIG. 6B is a flowchart illustrating an example CBT generating process using a step-wise module in accordance with some embodiments.

FIG. 6B is a flowchart illustrating an example CBT generating process 600 using a step-wise module in accordance with some embodiments.

In step 602, the step-wise module creates a plurality of granular cluster groups 66 in FIG. 6A using a certain clustering algorithm by only combining attribute similarity measures and the substitutability measures. For example, 5 latent similar item groups are generated as illustrated in FIG. 6A. Each group cluster may contain no more than 10 items which are similar and substitutable with each other.

In step 604, all items in each group are considered at item group level to generate association metrics 61 to detect item pairs in each group based on the set of predetermined criteria required by the filter module.

In step 606, a hierarchical clustering 62 is performed on the detected item pairs by considering the calculated attribute similarity and substitutable similarity.

In some embodiments, the step-wise module may be suitable for categories, such as soup and hot beverages.

Figure 7A:
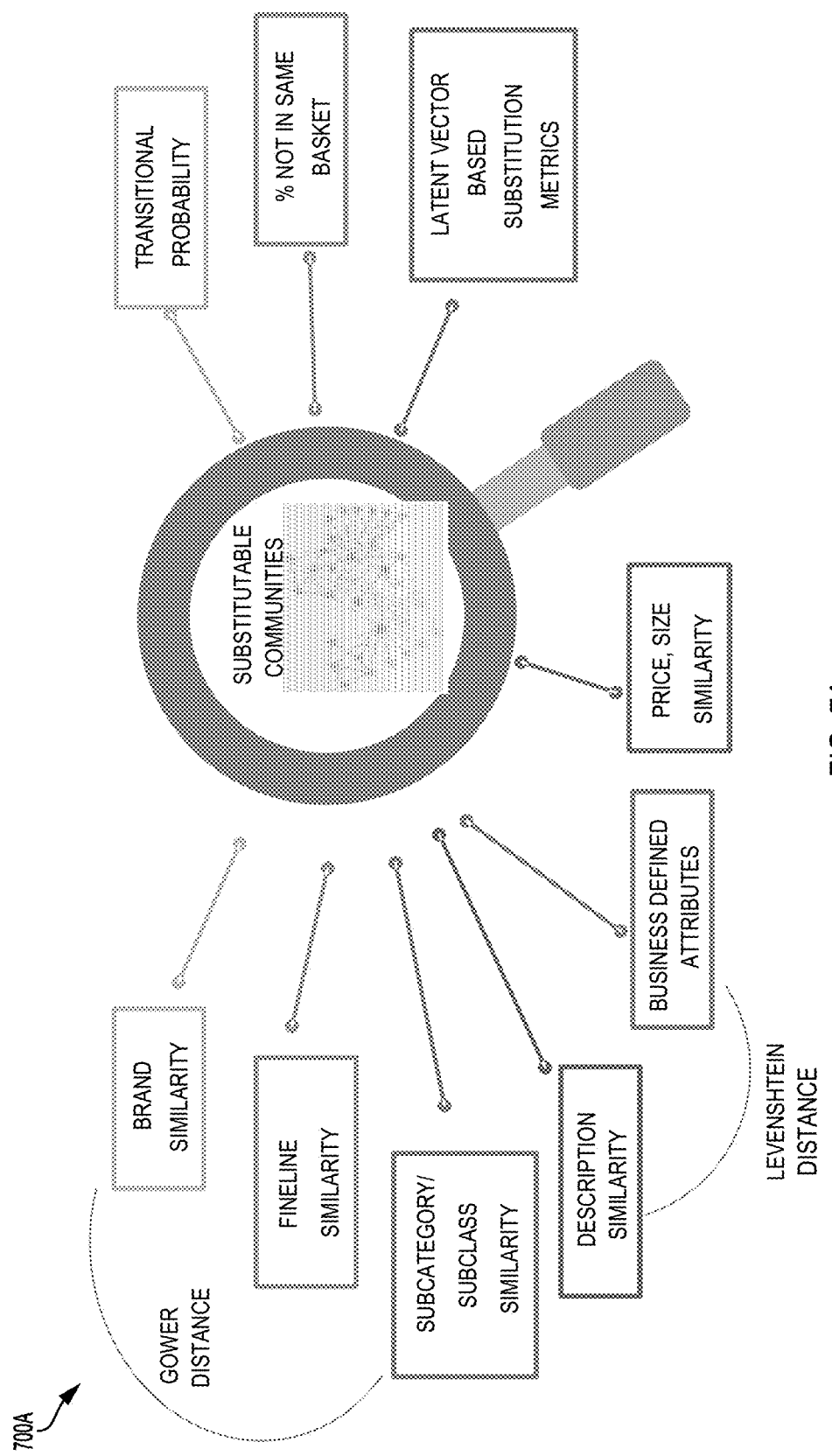
FIG. 7A is a diagram illustrating an example substitution module of a CBT generating process in accordance with some embodiments.

FIG. 7A is a diagram illustrating an example CBT generating process 700A using a substitution tree module in accordance with some embodiments.

In some cases, not many item pairs are purchased together by many households. Many items may be purchased randomly by households. Instead of relying on association metrics, the items may be grouped in terms of attributes and are considered substitutable. The similarity between a pair of items may be acquired by measuring a distance or dissimilarity of attributes of the pair of items. For example, Gower distance may be used to measure the distance the similarity between two compared character strings for an item pairs with regard to brand similarity, fineline similarity, and item subclass/subcategory similarity. A Levenshtein distance may be used to measure the difference between two compared character strings of an item pairs with regard to business defined attribute, item description attribute, pack size and price attributes. Latent Vector based substitution metrics are only used for cash market.

Using the substitution tree module, items may be grouped together if they have similar attributes and are substitutable. Substitutable graph based communities are generated by mapping the items with all types of similarities on a graph. The graph includes many sub-graphs representing different item groups. The sub-graphs are made of nodes or vertices, edges, and edge weights. In the sub-graphs, the nodes or vertices represent the items, and edge weights are defined as the combination of the attributes similarities of items. The sub-graphs form the substitutable graphs based communities. Different level substitutable communities may be created by setting different thresholds of edge weights of the subgraphs. A hierarchical clustering is performed on the formed substitutable communities with a particular edge width. The substitutable communities with the particular edge width may be transformed to a dendrogram and wireframe.

Figure 7B:
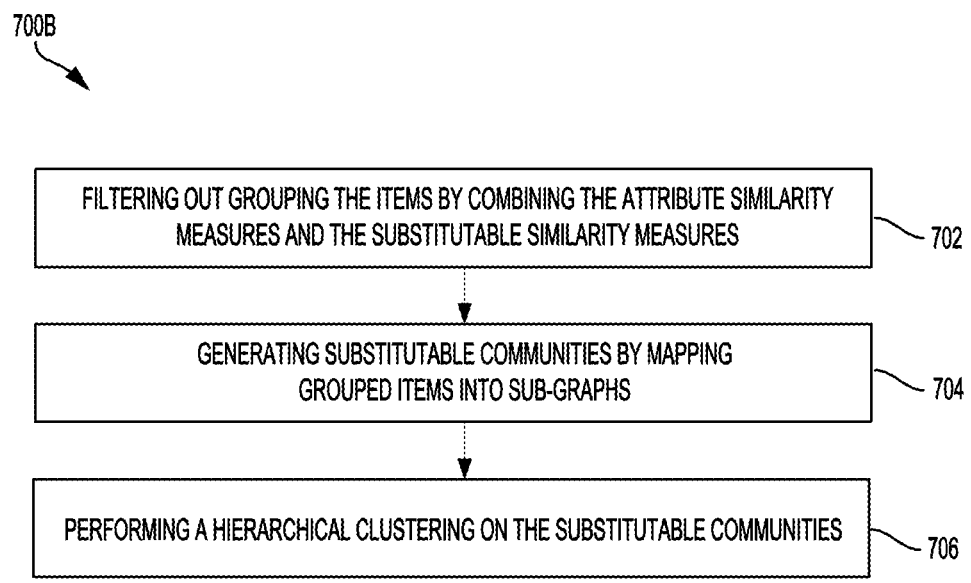
FIG. 7B is a flowchart diagram illustrating an example substitution module of a CBT generating process in accordance with some embodiments.

FIG. 7B is a flowchart diagram illustrating an example substitution module of a CBT generating process 700B in accordance with some embodiments.

In step 702, the items are grouped by combining the attribute similarity measures and the substitutable similarity measures.

In step 704, substitutable communities are generated by mapping grouped items into sub-graphs, the sub-graphs comprising vertices, edges, and edge weights.

In step 706, a hierarchical clustering is performed on the substitutable communities by setting different thresholds of edge weights of the sub-graphs.

Advantages of a substitution tree module for generating a CBT are that the generated CBT is more interpretable and suitable for cash market. The substitution tree module is less dependency on traced tender associated with customers' yearly transaction records. One embodiment is to apply this CBT generating method to cheese categories.

Figure 8:
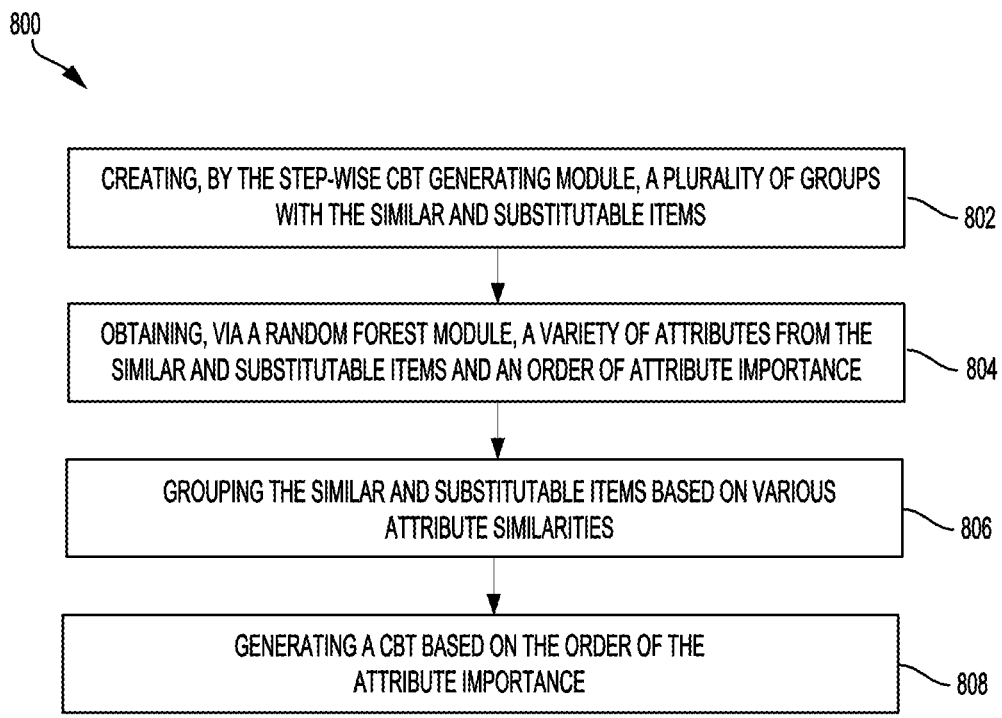
FIG. 8 is a diagram illustrating an example attribute decision module of a CBT generating process in accordance with some embodiments.

FIG. 8 is a diagram illustrating an example CBT generating process using an attribute decision tree module in accordance with some embodiments.

When the household information is not reliable, it can be understood how the customers are looking at a set of attributes together and how those attributes reflect the substitutable similarities of the items.

In step 802, the items analyzed by the attribute decision tree modules are from the similar and substitutable item groups generated using the step-wise module. In one embodiment, 5 small similar and substitutable item groups are generated as illustrated in FIG. 6A. Each group cluster may contain no more than 10 items which are similar to and substitutable with each other.

In step 804, the module may choose and obtain the attributes of brand, fineline, price bucket, latent topics from item description, and size, case packs from the generated similar and substitutable item groups.

In step 806, instead of performing a hierarchical clustering on the similar items based on the association at the item level, all the similar and substitutable items may be grouped based on various attribute similarities. For example, a random forest module may be trained on substitutable groups based on the chosen attributes to get an order of item attribute importance for decision making. It is important to use an appropriate order of attributes in item grouping. For example, the attribute of brand may be selected to as the most important attribute.

In step 808, a CBT classification tree may be built based on the order of the item attribute importance. Further, the CBT tree may be transformed to a dendrogram and wireframe.

In some embodiments, the attribute decision tree module of the CBT generating process may be applied to the categories, such as cheese, medicine, dietary, bath tissue, etc.

The advantages of this method is more interpretable and less dependency on traced tender associated with the customer's yearly transaction data. The disadvantages of this method is that it may lead to build a wide tree. If some levels of the CBT tree is removed by reducing the width, the related interpretable information about the classification tree may be lost.

Figure 9:
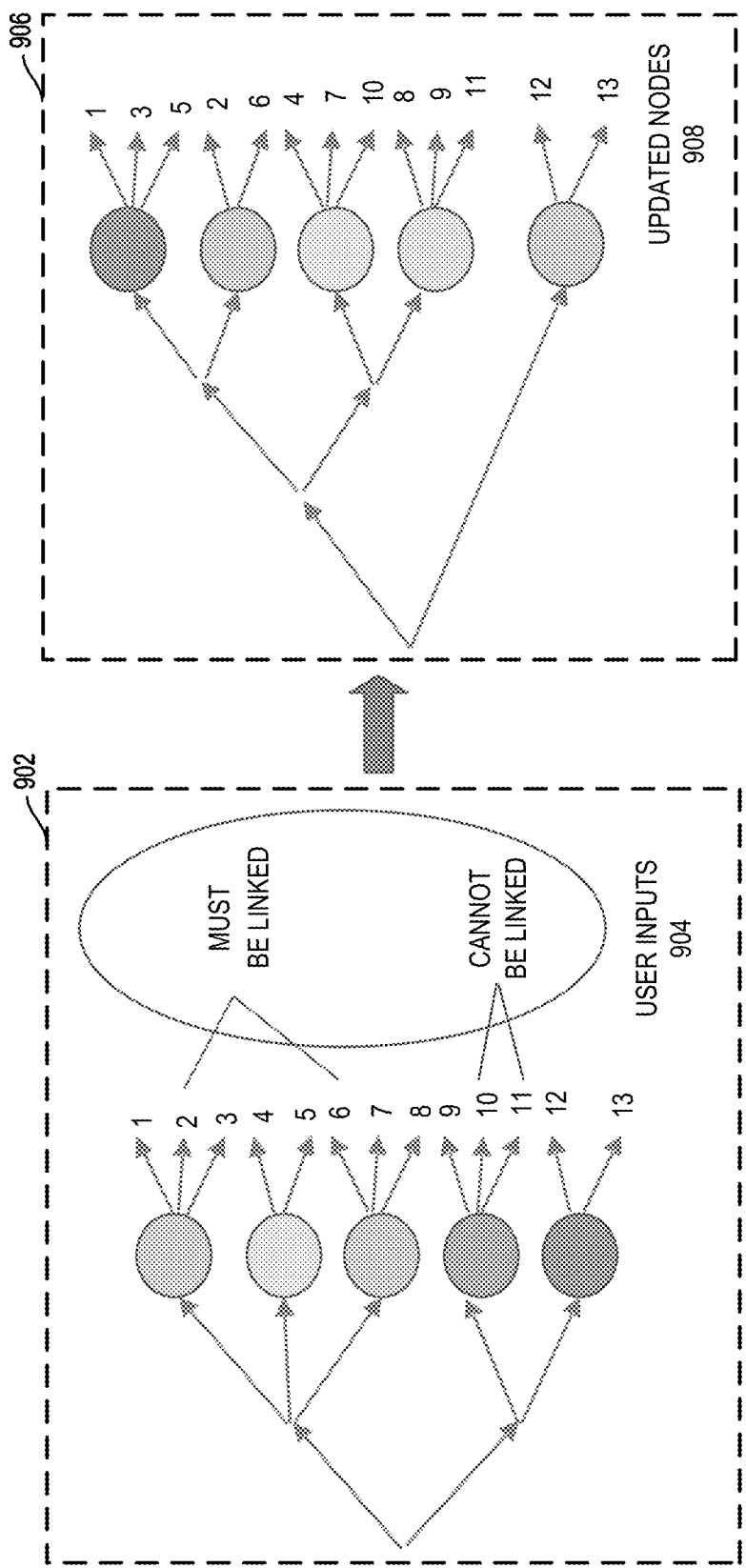
FIG. 9 is a diagram illustrating an example mechanism of manually reclassifying items and rebuilding the tree in a CBT generating process in accordance with some embodiments.

FIG. 9 is a diagram illustrating an example mechanism of manually reclassifying items and rebuilding the tree in a CBT generating process in accordance with some embodiments.

The mechanism of manually reclassifying items and rebuilding the tree is used by incorporating the customer feedback for cleaning the CBT generated using different modules. The mechanism is compatible with different CBT modules. Before a formed CBT is outputted to a wirefame tool, an option to accept user inputs may be given for a user to select item pairs in the CBT and decide whether the items are suitable to be put or linked together. In some embodiments, the user may be a category manager or a customer. The user may make decisions of "Must Be Linked" or "Cannot Be Linked" at an item-pair level. For example, item 2 and item 6 are the similar or substitutable items and can be linked together. Item 10 and item 11 are not the similar or substitutable items and cannot be linked together. Referring to FIG. 9, user inputs 904 are shown in block 902. In block 906, the item pairs are reclassified on the updated CBT nodes 908 according to the user input 904. Thus, as illustrated in block 906, item 2 and item 6 are updated and linked together. Item 10 and item 11 are updated and linked with different similar items, respectively. The user inputs and feedback may help in optimizing the item pairs in the CBT and automatically rebuilding the CBT with much clearer item or product allocation. The advantages of this method may include incorporating user feedback to improve the module and interpretable nodes with less misclassifications. The disadvantages may include few user inputs do not improve the interpretability for a CBT with a large number of items. Further, a large number of successive user inputs may lead to a subjective CBT which is not data-driven, and further change the CBT structure such that the CBT may lost the partial named information at tree nodes.

Figure 10:
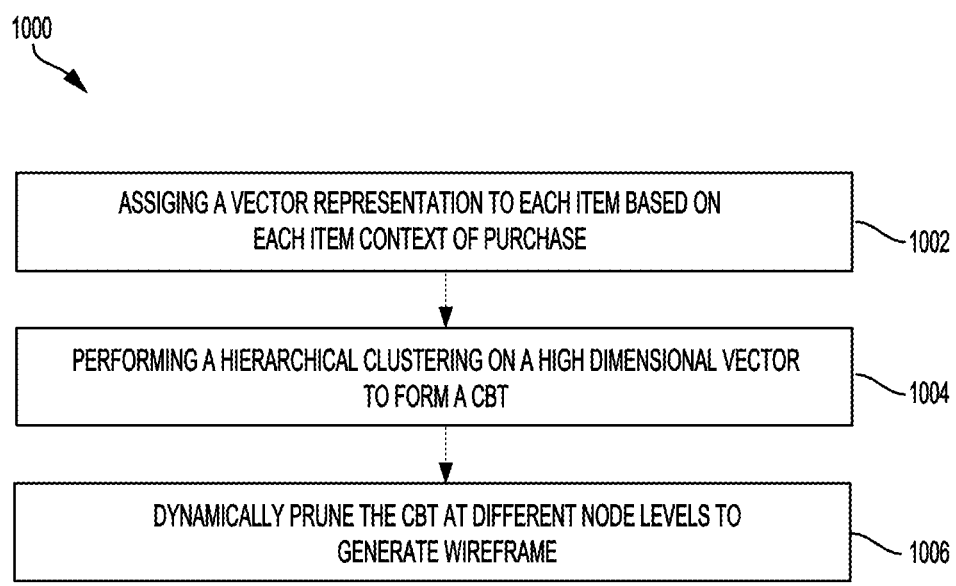
FIG. 10 is a diagram illustrating an example product vector module of a CBT generating process in accordance with some embodiments.

FIG. 10 is a diagram illustrating an example product vector module of a CBT generating process 1000 in accordance with some embodiments.

The product vector module for generating a CBT may be used in cash-heavy markets which are in the absence of traceable household information to capture the customer purchase pattern. For example, most of transactions may not involve in card transaction associated with households in some markets. In another example, there may be 90% cash transactions in an international market.

In some embodiments, the product vector module may process the transactions of all items purchased by all customers in one or more categories within a given period (e.g., one year).

In step 1002, based on the transaction information, each item is assigned a vector representation based on each item context of purchase. Each purchased item may correspond to a certain context in a word vector representation. The module can be represented by a 3 layer neural network with 1 input layer, 1 hidden layer and 1 output layer. The input layer is generated based on the purchased items in the baskets or transitions. The input layer is a sequence of purchased items which may be represented by a high dimensional vector or columned matrix. The high dimensional vector or columned matrix is a document term matrix. The output layer may be another sequence of items. The hidden layer between input layer and the output layer may include numerical vector representations, such as 200-dimention vectors or 200 columned matrix.

In step 1004, a hierarchical clustering is performed using Euclidean distance and Ward Linkage on a high dimensional vector (e.g., a vector representation) until a CBT is formed. Euclidean distance between the two elements in the input layer can be calculated and used to obtain the most similar elements in the input layer. Ward Linkage can define how the distance between two clusters is measured.

In step 1006, the product vector module may dynamically prune the CBT at different node levels to generate a wireframe in order to optimize the tree size based on a measure of the CBT height or until a given number of CBT clustering groups remains.

The product vector module may be used to predict the next item which may be purchased in the next basket.

In some embodiments, the system may use roll-up ID description which means a description of synonyms items. Universal Product Code (UPC) level vectors may be rolled up to roll-up ID level. Appropriate filters are used to filter out items with less influence.

The advantages of using the product vector module to generate a CBT are: 1) no dependency on traced tender; 2) resultant tree is similar to traditional CBTs using traced tender; and 3) the nodes are more interpretable and capture substitutability greater than a purely association based CBT. The disadvantages of using the product vector module are: 1) the module is compute-intensive and difficult to scale for all stores and all products; 2) the module includes validation of latent vector features.

Figure 11:
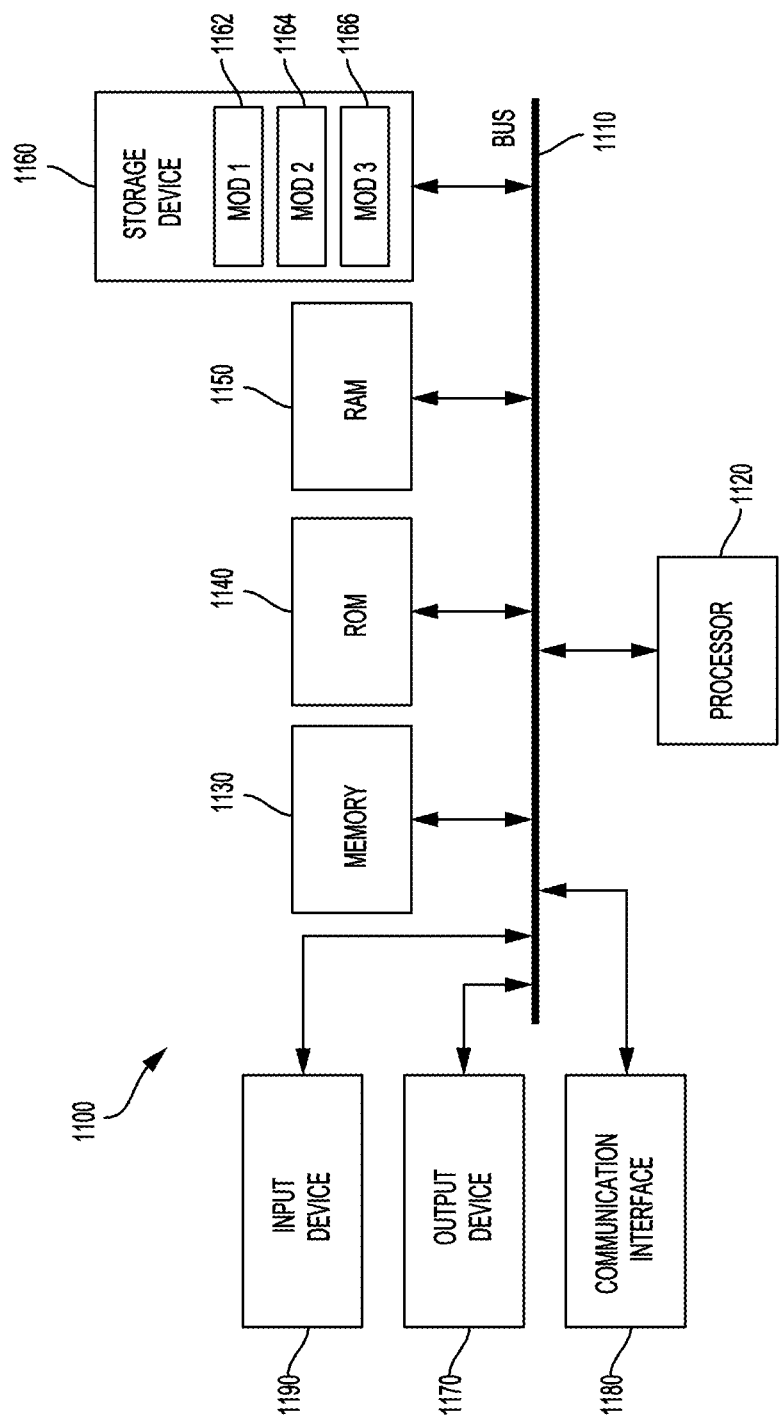
FIG. 11 is a block diagram an example computer system in which some example embodiments may be implemented.

FIG. 11 illustrates an example computer system 1100, which may be used to implement embodiments as disclosed herein. The computing system 1100 may be a server, a personal computer (PC), or another type of computing device. The exemplary system 1100 can include a processing unit (CPU or processor) 1120 and a system bus 1110 that couples various system components including the system memory 1130 such as read only memory (ROM) 1140 and random access memory (RAM) 1150 to the processor 1120. The system 1100 can include a cache of high speed memory connected directly with, in close proximity to, or integrated as part of the processor 1120. The system 1100 copies data from the memory 1130 and/or the storage device 1160 to the cache for quick access by the processor 1120. In this way, the cache provides a performance boost that avoids processor 1120 delays while waiting for data. These and other modules can control or be configured to control the processor 1120 to perform various actions. Other system memory 1130 may be available for use as well. The memory 1130 can include multiple different types of memory with different performance characteristics. It can be appreciated that the disclosure may operate on a computing device 1100 with more than one processor 1120 or on a group or cluster of computing devices networked together to provide greater processing capability. The processor 1120 can include any general purpose processor and a hardware module or software module, such as module 1 1162, module 2 1164, and module 3 1166 stored in storage device 1160, configured to control the processor 1120 as well as a special-purpose processor where software instructions are incorporated into the actual processor design. The processor 1120 may essentially be a completely self-contained computing system, containing multiple cores or processors, a bus, memory controller, cache, etc. A multi-core processor may be symmetric or asymmetric.

The system bus 1110 may be any of several types of bus structures including a memory bus or memory controller, a peripheral bus, and a local bus using any of a variety of bus architectures. A basic input/output (BIOS) stored in ROM 1140 or the like, may provide the basic routine that helps to transfer information between elements within the computing device 1100, such as during start-up. The computing device 1100 further includes storage devices 1160 such as a hard disk drive, a magnetic disk drive, an optical disk drive, tape drive or the like. The storage device 1160 can include software modules 1162, 1164, 1166 for controlling the processor 1120. Other hardware or software modules are contemplated. The storage device 1160 is connected to the system bus 1110 by a drive interface. The drives and the associated computer-readable storage media provide non-volatile storage of computer-readable instructions, data structures, program modules and other data for the computing device 1100. In one aspect, a hardware module that performs a particular function includes the software component stored in a tangible computer-readable storage medium in connection with the necessary hardware components, such as the processor 1120, bus 1110, display 1170, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 1100 is a small, handheld computing device, a desktop computer, or a computer server.

Although the exemplary embodiment described herein employs the hard disk 660, other types of computer-readable media which can store data that are accessible by a computer, such as magnetic cassettes, flash memory cards, digital versatile disks, cartridges, random access memories (RAMs) 1150, and read only memory (ROM) 1140, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 1100, an input device 1190 represents any number of input mechanisms, such as a microphone for speech, a touch-sensitive screen for gesture or graphical input, keyboard, mouse, motion input, speech and so forth. An output device 1170 can also be one or more of a number of output mechanisms known to those of skill in the art. In some instances, multimodal systems enable a user to provide multiple types of input to communicate with the computing device 1100. The communications interface 1180 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

What is claimed is:

1. A computer-implemented method for generating a consumer behavior tree (CBT) with a hierarchical data structure visible from a customer's perspective, the method comprising:
    acquiring, by a processor of a computing device from a database, sales data associated with items and item pairs in a category for a given period;
    filtering, by the processor and based on a set of predetermined criteria and by a filter module, the sales data to obtain the items and the item pairs associated with a customer;
    generating, by the processor, document term matrices for the item pairs based on item description and item attributes;
    calculating, by the processor, attribute similarity measures and substitutability measures for the item pairs;
    performing, based on a set of predefined CBT generating rules, a hierarchical clustering on the document term matrices, item association, the substitutability measures and the attribute similarity measures, wherein the set of predefined CBT generating rules comprising at least one of first version CBT generating module and a step-wise CBT generating module;
    generating the CBT with a hierarchical grouping of the items;
    transforming the CBT to a dendrogram;
    pruning the dendrogram to generate a wireframe;
    regrouping, based on feedback, the item pairs in CBT nodes with similar and substitutable attributes; and
    generating, by the processor, a user interface to visualize the CBT, wherein the user interface is configured to:
    display item details of each of CBT nodes;
    change names of the CBT nodes; and
    present item images, node demographics, word cloud and term frequency table associated with the CBT nodes.

2. The method of claim 1, wherein, based on the set of predetermined criteria, the filtering further comprises:
    obtaining, by the filter module, the items sold in at least 10% retail stores and contribute to 95% of cumulative sales of the retail stores; and
    obtaining the item pairs bought by at least 1000 households and bought together by at least 100 households, wherein the filter module is modified based on a purchase frequency on the items.

3. The method of claim 1, wherein the item attributes comprise brand, fineline, price bucket, size, and case packs.

4. The method of claim 1, wherein:
    the attribute similarity measures comprises brand similarity, fineline similarity, and item subclass/subcategory similarity, description similarity, business defined attributes similarity, price similarity, size similarity; and
    the substitutability measures comprises a percentage of transactions that the pair items are not purchased at the same time and transitional probability similarity.

5. The method of claim 1, wherein the calculating comprises calculating a Gower Distance and a Levenshtein distance.

6. The method of claim 1, wherein the set of the predefined rules related to the first version CBT generating module comprises:
    choosing an optimal CBT based on results of the hierarchical clustering; and
    dynamically pruning the CBT to a proper CBT size.

7. The method of claim 1, wherein the set of the predefined rules associated with the step-wise CBT generating module comprises:
    creating a plurality of groups of items by combining the attribute similarity measures and the substitutability measures;
    detect item pairs in the plurality of the groups based on the set of predetermined criteria required by the filter module; and
    performing a hierarchical clustering on the detected item pairs by considering the attribute similarity and substitutable similarity.

8. The method of claim 1, wherein the set of the predefined rules associated with a substitution tree CBT generating module further comprising:
    grouping the items by combining the attribute similarity measures and the substitutability measures;
    generating substitutable communities by mapping grouped items into sub-graphs, the sub-graphs comprising vertices, edges, and edge weights; and
    performing a hierarchical clustering on the substitutable communities by setting different thresholds of edge weights of the sub-graphs.

9. The method of claim 1, wherein the set of the predefined rules associated with an attribute decision CBT generating module comprises:
    creating, by the step-wise CBT generating module, a plurality of groups with the similar and substitutable items by combining the attribute similarity measures and the substitutability measures;
    obtaining, via a random forest module, a variety of attributes from the similar and substitutable items and an order of attribute importance;
    grouping the similar and substitutable items based on various attribute similarities; and
    generating a CBT based on the order of the attribute importance.

10. The method of claim 1, further comprising:
    reclassifying filtered items based on the document term matrices.

11. A computer-implemented method for generating a consumer behavior tree (CBT) with a hierarchical data structure, the method comprising:
    acquiring, by a processor of a computing device from a database, one year of sales data associated with all items in one or more categories;
    generating, by the processor, a document term matrix by assigning a vector representation to all items based on each item context of purchase;
    performing, by the processor based on a product vector module, a hierarchical clustering on the document term matrix using Euclidean distance and Ward linkage;
    generating the CBT with a hierarchical grouping of the items;
    transforming the CBT to a dendrogram;
    pruning the dendrogram to generate a wireframe; and
    upon the CBT is formed, generating, by the processor, a user interface to visualize the CBT, wherein the user interface is configured to:
    display item details of each of CBT nodes;
    change names of the CBT nodes; and present item images, node demographics, word cloud and term frequency table associated with the CBT nodes.

12. A system for generating a consumer behavior tree (CBT) visible from a customer's perspective, comprising:
a processor; and
non-transitory computer-readable storage medium having instructions stored which, when executed by the processor, cause the processor to perform operations comprising:
acquiring, by a processor of a computing device from a database, sales data associated with items and item pairs in a category for a given period;
filtering, by the processor, based on a set of predetermined criteria and by a filter module, the sales data to obtain the items and the item pairs associated with a customer;
generating, by the processor, document term matrices for the item pairs based on item description and item attributes;
calculating, by the processor, attribute similarity measures and substitutability measures for the item pairs;
performing, based on a set of predefined CBT generating rules, a hierarchical clustering on the document term matrices, item association, the substitutability measures and attribute similarity measures, wherein the set of predefined CBT generating rules comprising at least one of a first version CBT generating module and a step-wise CBT generating module;
generating the CBT with a hierarchical grouping of the items;
transforming the CBT to a dendrogram;
pruning the dendrogram to generate a wireframe;
regrouping, based on feedback, item pairs in CBT nodes with similar and substitutable attributes; and
generating, by the processor, a user interface to visualize the CBT, wherein the user interface is configured to:
display item details of each of CBT nodes;
change names of the CBT nodes; and
present item images, node demographics, word cloud and term frequency table associated with the CBT nodes.

13. The system of claim 12, wherein, based on the set of the predetermined criteria, the filtering further comprises:
obtaining, by the filter module, the items sold in at least 10% retail stores and contribute to 95% of cumulative sales of the retail stores; and
obtaining the item pairs bought by at least 1000 households and bought together by at least 100 households, wherein the filter module is modified based on a purchase frequency on the items.

14. The system of claim 12, wherein the item attributes comprise brand, fineline, price bucket, size and case packs.

15. The system of claim 12, wherein:
the attribute similarity measures comprises brand similarity, fineline similarity, and item subclass/subcategory similarity, description similarity, business defined attributes similarity, price similarity, size similarity; and
the substitutability measures comprises a percentage of transactions that the pair items are not purchased at the same time and transitional probability similarity.

16. The system of claim 12, wherein the calculating comprises calculating a Gower Distance and a Levenshtein distance.

17. The system of claim 12, wherein the set of the predefined rules related to the first version CBT generating module comprises:
choosing an optimal CBT based on results of the hierarchical clustering; and
dynamically pruning the CBT to a proper CBT size.

18. The system of claim 12, wherein the set of predefined rules associated with the step-wise CBT generating module comprises:
creating a plurality of groups of items by combining the attribute similarity measures and the substitutability measures;
detect item pairs in the plurality of the groups based on the set of predetermined criteria required by the filter module; and
performing a hierarchical clustering on the detected item pairs by considering the attribute similarity and substitutable similarity.

19. The system of claim 12, wherein the set of the predefined rules associated with a substitution tree CBT generating module further comprising:
grouping the items by combining the attribute similarity measures and the substitutability measures;
generating substitutable communities by mapping grouped items into sub-graphs, the sub-graphs comprising vertices, edges, and edge weights; and
performing a hierarchical clustering on the substitutable communities by setting different thresholds of edge weights of the sub-graphs.

20. The system of claim 12, wherein the set of the predefined rules associated with an attribute decision CBT generating module comprises:
creating, by the step-wise CBT generating module, a plurality of groups with the similar and substitutable items by combining the attribute similarity measures and the substitutability measures;
obtaining, via a random forest module, a variety of attributes from the similar and substitutable items and an order of attribute importance;
grouping the similar and substitutable items based on various attribute similarities; and
generating a CBT based on the order of the attribute importance.

* * * * *